United States Patent

[11] 3,614,243

[72] Inventor Robert J. Harvey
Ramsey, N.J.
[21] Appl. No. 846,778
[22] Filed Aug. 1, 1969
[45] Patented Oct. 19, 1971
[73] Assignee Reno A. Del Ben
Tenafly, N.Y.
a part interest

[54] VARIABLE PATH-LENGTH GAS CELL
8 Claims, 9 Drawing Figs.
[52] U.S. Cl. ................................................. 356/246,
250/43.5 R
[51] Int. Cl. ............................................... G01n 1/10
[50] Field of Search ............................................ 356/51,
244, 246, 96, 97; 250/43.5 R, 218

[56] References Cited
UNITED STATES PATENTS
2,690,695 10/1954 Coates ........................ 250/43.5 X
2,805,339 9/1957 Laird .......................... 250/43.5

Primary Examiner—William L. Sikes
Assistant Examiner—Orville B. Chew, II
Attorney—Reno A. Del Ben ABSTRACT: A variable path-length gas cell which includes a base, an inner gas cell member coupled to said base, a crystal contained between the base and the inner gas cell member, an outer gas cell member movably mounted on the inner gas cell member, a second crystal mounted at an end of the outer gas cell member, and an aperture which runs from one end of the gas cell to the other end of the gas cell and is blocked near each end by the crystals, the length and volume of said aperture being variable.

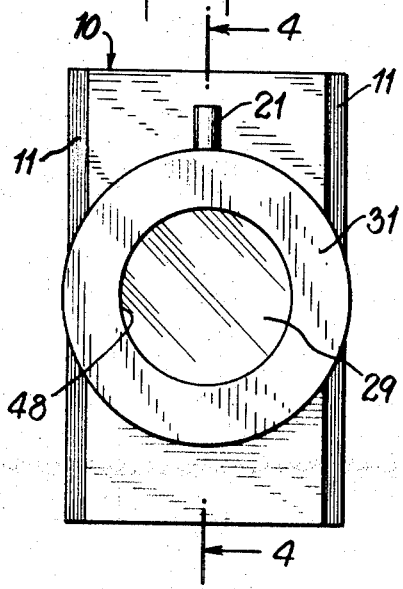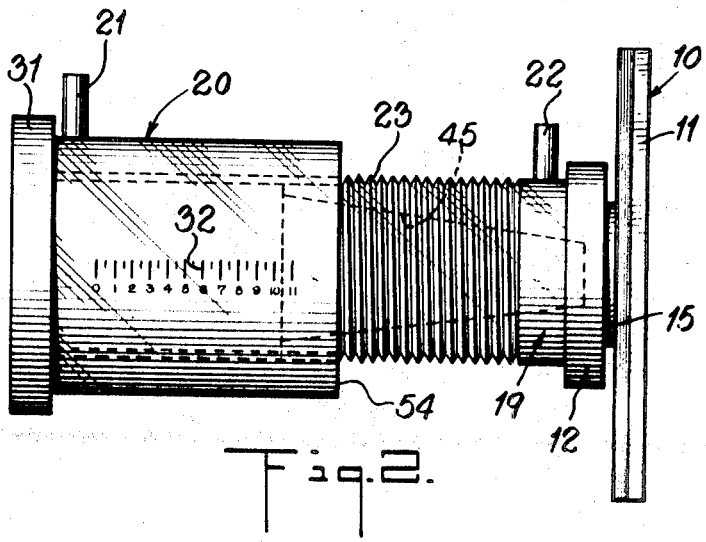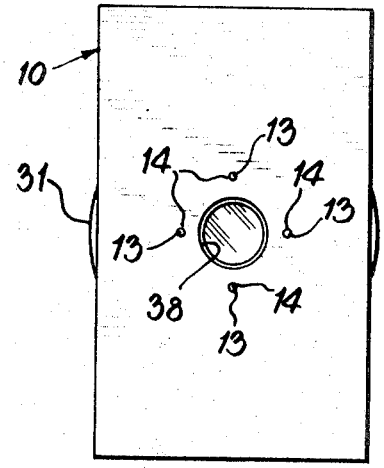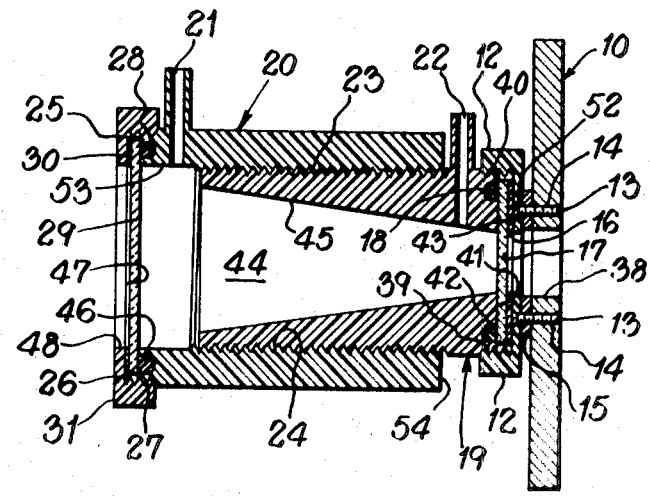

INVENTOR
ROBERT J. HARVEY
BY
ATTORNEY

VARIABLE PATH-LENGTH GAS CELL

This invention relates to gas cells for use with spectrometers and other optical measuring instruments, and particularly to a cell which can be used to hold gases and the length of which can be varied.

In the past, gas cells which have been available for use with spectrometers and other optical measuring instruments have been of the fixed path-length type, and in order to measure the effect of varying path lengths, for gas samples being analyzed an experimenter required a separate cell for each length desired.

One of the objects of this invention is to provide a gas cell, which can be used with a spectrometer or other optical measuring instrument, and which can be used to hold gas samples for analysis.

Another object of this invention is to provide a gas cell having a variable path-length for light or other radiation passing through the cell.

Another object of this invention is to provide a variable path-length gas cell, for use with spectrometers and other measuring instruments, whose path-length may be easily varied.

Another object of this invention is to provide a variable path-length gas cell which can be used to hold various samples of gases, and which has means whereby the volume of the cell may be easily varied, so as to permit the study of the various samples of gases under varying conditions of pressure or partial vacuum.

Another object of this invention is to provide a gas cell which may be used in conjunction with a spectrometer or other optical measuring instrument, either by the direct transmission of radiation through the cell and into the measuring instrument, or by mounting the cell in an optical bench and analyzing in the measuring instrument radiation reflectively transmitted through the cell.

Still another object of this invention is to provide a variable path-length gas cell of simple construction, which may be economically manufactured.

These and other objects of the invention will appear from time to time as the following specifications proceed, and with reference to the accompanying drawing, wherein:

FIG. 1 is an end elevational view of the invention, as seen from the left side of the invention as shown in FIG. 2.

FIG. 2 is a front elevational view of the invention;

FIG. 3 is an end elevational view of the invention, as seen from the end opposite that of FIG. 1;

FIG. 4 is a cross-sectional view of the invention, the cross section being taken on a vertical plane, at the location of and in the direction shown by 4–4 as shown in FIG. 1;

as shown in FIG. 5;

Referring to the drawings in which the same or similar parts have been given the same numerals in the several figures:

Figure 5:
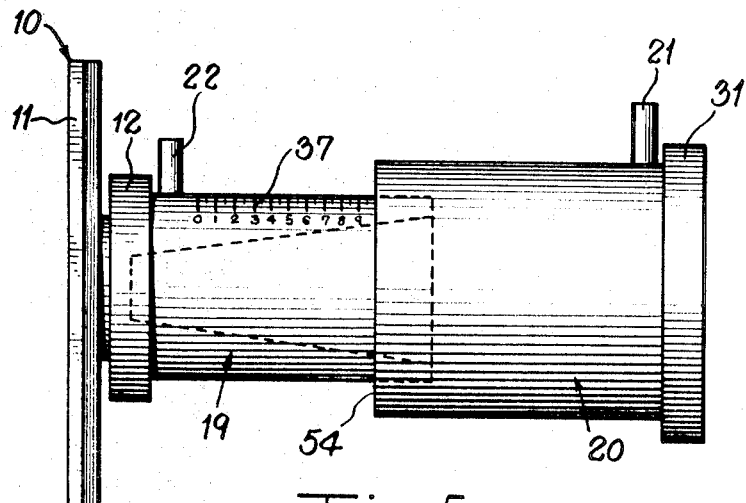
FIG. 5 is a front elevational view of the invention in an alternate embodiment.
Figure 6:
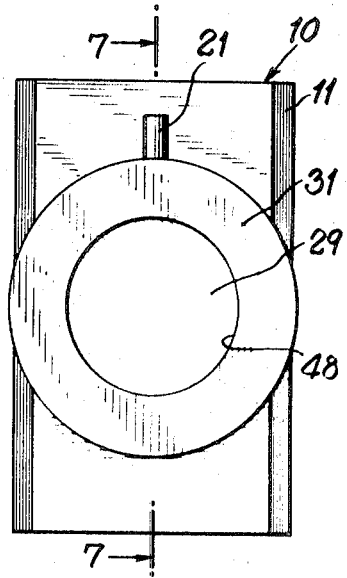
FIG. 6 is an end elevational view of the invention, as seen from the right side of the invention, in its alternate embodiment.

The gas cell, in a preferred embodiment, comprises a base, 10, having a flange, 11, whereby the base may be mounted in a mounting provided in the spectrometer or other optical measuring instrument with which the gas cell is to be used. The base is provided with an aperture, 38, through which radiation may pass. Connected to the base, 10, is a coupling member, 12, which is in the form of a cap and which is mounted on the base by means of screws 13 which fit into threaded screw holes 14 provided in the base 10 and which screws also pass through holes 52 provided in the coupling member, said holes being located in spacial relationship with the screw holes, 14, provided in the base, 10. Interposed between the base, 10, and the coupling member, 12, is an annular gasket, 15, which is held in place by screws 13.

The coupling member, 12, is provided with internal screw threads, 39, into which the end, 41, of an inner gas cell member, 19, having external screw threads 40 at one end, 41, is screwed, with threads 39 and 40 meshing closely. The end 41 of the inner gas cell member 19 is provided with a circular groove, 42, into which an "O" ring, 18, is partially countersunk. Interposed between the end 41 of the inner gas cell member 19, and the inner surface 43 of the coupling member are, first, an annular gasket 16, and then a crystal 17, through which radiation may pass.

The "O" is provided to form a gas tight seal between the crystal 17 and the inner gas cell member end, 41, and to prevent scratching of the crystal 17 by the inner gas cell member 19, whereas the gasket 16 is provided to prevent scratching of the crystal by the coupling member inner surface, 43.

The external configuration of the inner gas cell member 19 is substantially circular, and the inner gas cell member 19 is provided with a tapered bore, 45, which passes axially through the inner gas cell member, 19. The inner gas cell member, 19, is also provided with external threads, 23, extending around the circumference of the inner gas cell member 19, as shown in FIGS. 2 and 4.

Mounted on and turnable about the inner gas cell member 19 is an outer gas cell member 20 which is provided with internal threads 24 which commence at end 54 of the outer gas cell member 20 and which mesh closely with the external threads, 23, of the inner gas cell member, enabling the outer gas cell member, 20, to be screwed onto the inner gas cell member 19 to varying degrees. At the end 25 of the outer gas cell member 20, an aperture, 53, is provided which commences at the end 25 and connects to the circular cavity formed by the internal threads 24, permitting the transmission of radiation from one end, 25, to the other end, 54, of the outer gas cell member 20.

The end, 25, of the outer gas cell member 20 is provided with external threads 27 for a short distance inwards from the end 25. A cap, 31, having internal threads, 26, which mesh closely with external threads 27 is mounted on the outer gas cell member 20 at the end 25. At the end 25 of the outer gas cell member 20, there is provided a circular groove, 46, into which an "O" ring, 28, is partially countersunk. Interposed between the inner surface 47 of the cap 31 are, first, a gasket, 30, which is placed next to the inner surface 47 of the cap 31, and then a crystal 29 which, when the cap 31 is placed on the end 25 of the outer gas cell member 20, comes into contact with the "O" ring 28 resulting in a gastight connection between the "O" ring 28 and the crystal 29. The cap 31 is provided with an aperture 48 through which radiation may pass.

The external threads 23 and the internal threads 24 are covered with a resilient material such as that commercially known as "Teflon," which will aid in forming a gastight seal between the threads of the inner and outer gas cell members.

The inner gas cell member 19 and the outer gas cell member 20 are provided with filler and exhaust connection tubes, 21 and 22, which are sealed off by means of a valve or by means of a septum covering said tubes, and which tubes connect with the inner chambers of the gas cell members.

When all of the various elements of the invention as herein delineated are combined as indicated, there is formed within the gas cell a gastight chamber, 44, whose volume and length are variable by the degree to which the outer gas cell member 20 is screwed onto the inner gas cell member 19.

The outer gas cell member 20 may be formed of a transparent material such as plastic, and in that case, graduations 32 may be provided on the external surface of the outer gas cell member 20 to permit calibration of the length and volume of the chamber 44, which will be directly related to the degree to which the outer gas cell member 20 is screwed onto the inner gas cell member 19.

The conical bore of the inner gas cell member 19 is provided to permit the analysis of smaller samples of gases than if such a bore were not provided.

In the alternate embodiment of FIGS. 5, 6, 7, 8, and 9, there is substituted, in place of threads 23 and 24 as shown in FIGS. 2 and 4, a slidable piston arrangement, in which an O-ring 33, which is partially countersunk in a circular groove provided in the outer circumference of the inner gas cell member 19, is used to form a gastight seal between the inner gas cell member 19 and the outer gas cell member 20. In this alternate embodiment, the outer gas cell member 20 is provided with an axial bore, 49, extending through the greater portion thereof, the diameter of the axial bore being slightly greater than the circumference of the inner gas cell member 19 at the location of the "O" ring, 33, and the outer gas cell member 20 being slideably disposed around the inner gas cell member 19. In the alternate embodiment shown, graduations 37 are provided on the circumference of the inner gas cell member to provide calibration of the chamber 44 formed within the gas cell members.

Figure 7:
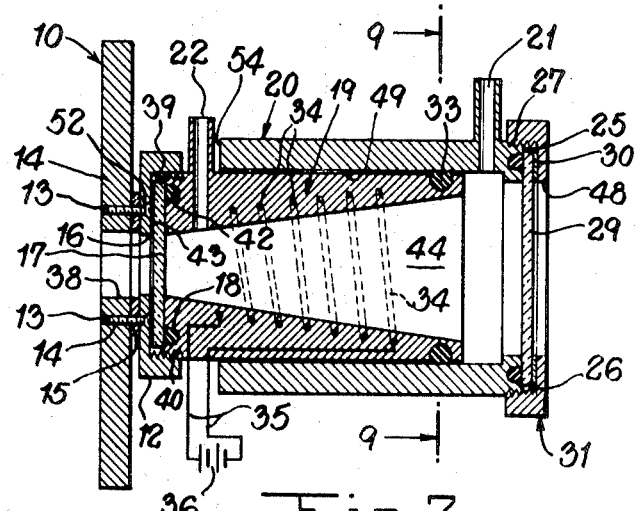
FIG. 7 is a cross-sectional view of the invention in its alternate embodiment of FIG. 5, the cross section being taken on a vertical plane, at the location of and in the direction shown by 7–7, as shown in FIG. 6.
Figure 8:
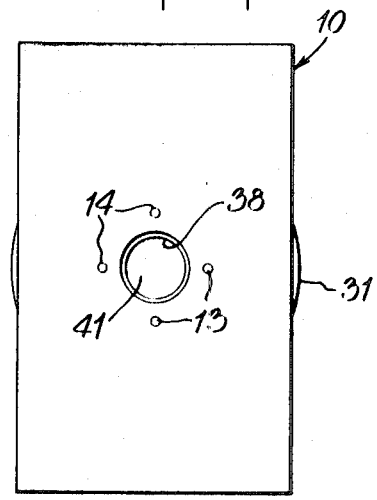
FIG. 8 is an end elevational view of the invention in its alternate embodiment, as seen from the end opposite that of FIG. 6.
Figure 9:
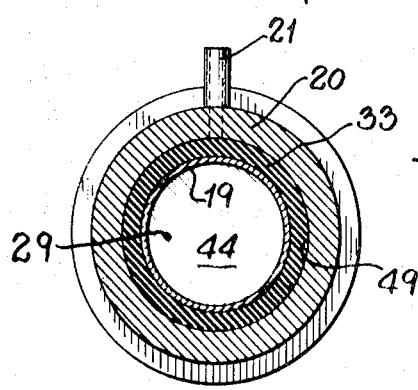
FIG. 9 is a cross-sectional view of the invention, in its alternate embodiment of FIG. 5, the cross section being taken on a vertical plane, at the location of and in the direction shown by 9–9 as shown in FIG. 7.

The alternate embodiment of FIG. 7 has also been shown with an optional spiral electrical heating element, 34, which is embedded into the material of the inner gas cell member 19, with wire leads 35 leading out of the inner gas cell member 19 to a source of current, here shown as a battery, 36. Said electrical heating element may be provided to heat a gas sample, should it be desired to determine the effect of heat or temperature changes on the gas sample.

In use, the gas cell is first adjusted by adjusting the degree to which the outer gas cell member 20 is mounted on the inner gas cell member 19. The cell is then exhausted and is then filled with the desired gas sample, through tubes 21 and 22, which are then sealed. Subsequently, the gas cell is mounted on a spectrometer or other desired optical measuring instrument, radiation of the desired frequency and amplitude is transmitted through aperture 48 and collected in the measuring instrument after passing through aperture 38, and the gas is then analyzed in the measuring instrument. The pressure of the gas sample and path-length through the gas sample may then, if desired, be changed by rotating the outer gas cell member 20 around the inner gas cell member 19, or, in the alternate embodiment, by moving the outer gas cell 20 axially with respect to the inner gas cell member 19, and a new analysis may then be made at this different pressure and path-length.

While a number of different embodiments of the invention have herein been shown and described, it may readily be understood that various modifications and variations in the invention may be attained without departing from the spirit and scope of the novel concepts thereof, as defined by the claims appended hereto.

I claim:

1. A variable path-length gas cell comprising:
    a base, having an aperture;
    an inner gas cell member having an aperture extending through said inner gas cell member, which said aperture is a tapered bore which conforms to a converging beam of radiation;
    coupling means for coupling said inner gas cell member to said base, with the aperture in the base being aligned with the aperture in the inner gas cell member;
    a crystal contained between said aperture in the base and said aperture in the inner gas cell member;
    means for providing a gastight seal between said inner gas cell member and said crystal;
    an outer gas cell member mounted for movement axially on said inner gas cell member, said outer gas cell member having an aperture extending through said outer gas cell member;
    means for providing a gastight seal between the inner gas cell member and the outer gas cell member;
    a second crystal;
    means for mounting said second crystal over the aperture in the outer gas cell member at one end of the outer gas cell member;
    means for providing a gastight seal between said outer gas cell member and said second crystal;
    means for admitting gas to and evacuating gas from the apertures in the inner and outer gas cell members; and,
    means for determining the volume and path length of the gas cell, said means including a scale provided on either gas cell member, the volume of the gas cell being changed by the relative axial movement of the inner gas cell member with respect to the outer gas cell member.

2. A variable path-length gas cell comprising:
    a base having an aperture;
    an inner gas cell member having an aperture extending through said inner gas cell member;
    coupling means for coupling said inner gas cell member to said base, with the aperture in the base being aligned with the aperture in the inner gas cell member;
    a crystal contained between said aperture in the base and said aperture in the inner gas cell member;
    means for providing a gastight seal between said inner gas cell and said crystal;
    an outer gas cell member axially slideably mounted on said inner gas cell member, said outer gas cell member having an aperture extending through said outer gas cell member, said outer gas cell member being telescopically axially movably mounted on said inner gas cell member;
    resilient material interposed between said inner gas cell member and said outer gas cell member, which said resilient material is partially countersunk in a groove provided in the outer circumference of the inner gas cell member, said resilient material forming a gastight seal between the inner gas cell member and the outer gas cell member, and said resilient material being maintained in its relative axial position with respect to the inner gas cell member by said groove;
    a second crystal;
    means for mounting said second crystal over the aperture in the outer gas cell member at one end of the outer gas cell member;
    means for providing a gastight seal between said outer gas cell member and said second crystal;
    means for determining the volume and path length of the gas cell, said means including a scale provided on either gas cell member, the volume of the gas cell being changed by the relative axial movement of the inner gas cell member with respect to the outer gas cell member; and,
    an inlet provided on one of the gas cell members and an outlet provided on the other gas cell member for admitting gas to and evacuating gas from the gas cell.

3. A variable path-length gas cell as claimed in claim 2, wherein the inner gas cell member is provided with screw threads at one end and the coupling means for coupling said inner gas cell member to said base comprises:
    a threaded cap having an aperture, said cap being screwed onto said inner gas cell member;
    screw means for affixing said cap to said base; and,
    a gasket interposed between said cap and said base.

4. A variable path-length gas cell as claimed in claim 2, wherein the means for providing a gastight seal between said inner gas cell member and said crystal comprises an O-ring interposed between the end of said inner gas cell member and said crystal.

5. A variable path-length gas cell as claimed in claim 2, wherein the outer gas cell member is provided with screw threads at one end and the means for mounting said second crystal over the aperture in the outer gas cell member comprises a threaded cap having an aperture, said cap being threaded onto the end of the outer gas cell member and the said second crystal being contained between said cap and the end of said outer gas cell member.

6. A variable path-length gas cell as claimed in claim 2, wherein the means for providing a gastight seal between said outer gas cell member and said second crystal comprises an O-ring interposed between the end of said outer gas cell member and said crystal.

7. A variable path-length gas cell as claimed in claim 2, wherein the aperture in the inner gas cell member is a tapered bore.

8. A variable path-length gas cell as claimed in claim 2, wherein the cell is further provided with:
- a spiral electrical heating element, embedded into the material of the inner gas cell member; and,
- means for connecting said electrical heating element to a source of electrical current.